(12) United States Patent
Yoda

(10) Patent No.: US 8,305,448 B2
(45) Date of Patent: Nov. 6, 2012

(54) SELECTIVE PRIVACY PROTECTION FOR IMAGED MATTER

(75) Inventor: Koji Yoda, Kanagawa (JP)

(73) Assignee: Sony Corporation (JP)

( * ) Notice: Subject to any disclaimer, the term of this patent is extended or adjusted under 35 U.S.C. 154(b) by 536 days.

(21) Appl. No.: 12/378,090

(22) Filed: Feb. 11, 2009

(65) Prior Publication Data

US 2009/0207269 A1 Aug. 20, 2009

(30) Foreign Application Priority Data

Feb. 15, 2008 (JP) ................ P2008-034295

(51) Int. Cl.
*H04N 5/232* (2006.01)
(52) U.S. Cl. .................... 348/152; 348/211.1
(58) Field of Classification Search .............. 348/143, 348/152, 211.99, 211.1
See application file for complete search history.

(56) References Cited

U.S. PATENT DOCUMENTS

| 2003/0091239 | A1 | 5/2003 | Imagawa et al. |
| 2009/0244364 | A1* | 10/2009 | Nonogaki ............ 348/438.1 |

FOREIGN PATENT DOCUMENTS

| JP | 06090446 A | 3/1994 |
| JP | 2002281486 A * | 9/2002 |
| JP | 2003-219383 A | 7/2003 |
| JP | 3838506 | 10/2006 |

OTHER PUBLICATIONS

Office Action from Japanese Application No. 2008-034295, dated May 1, 2012.

* cited by examiner

*Primary Examiner* — Timothy J Henn
(74) *Attorney, Agent, or Firm* — Lerner, David, Littenberg, Krumholz & Mentlik, LLP

(57) ABSTRACT

An image processing device includes a face detector configured to detect a face based on a taken image, and an output processor configured to have a function to execute privacy-mask processing for privacy protection for an image of a face detected by the face detector or an image of a background of the face. The output processor includes a function to separately output an image of a face detected by the face detector and an image of a background of the face which are each subjected to or not subjected to the privacy-mask processing.

7 Claims, 10 Drawing Sheets

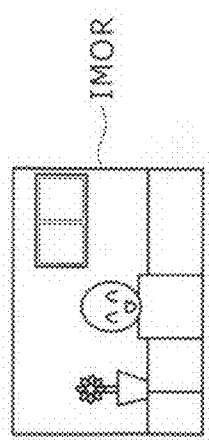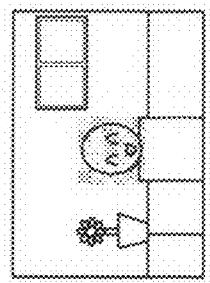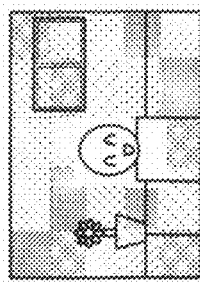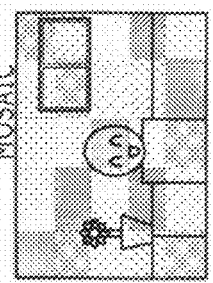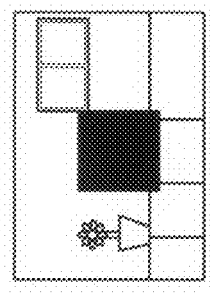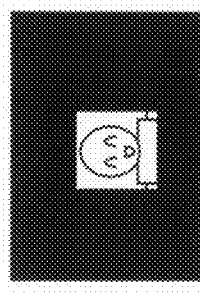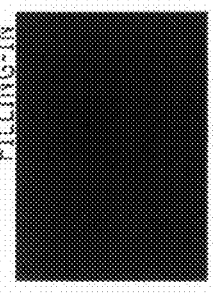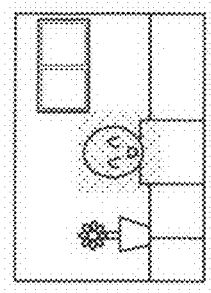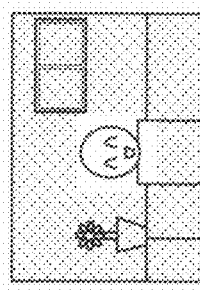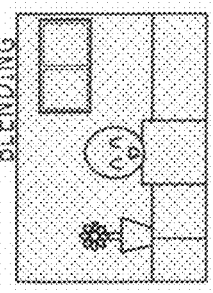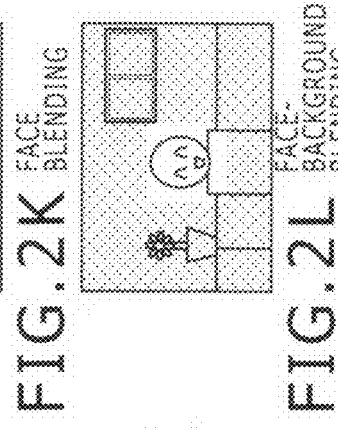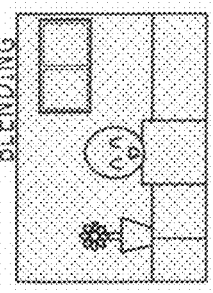

SELECTIVE PRIVACY PROTECTION FOR IMAGED MATTER

CROSS REFERENCES TO RELATED APPLICATIONS

The present application claims priority from Japanese Patent Application No. JP 2008-034295, filed in the Japanese Patent Office on Feb. 15, 2008, the entire content of which is incorporated herein by reference.

BACKGROUND OF THE INVENTION

1. Field of the Invention

The present invention relates to an image processing device, a camera device, a communication system, an image processing method, and a program that have a function to detect a face from a taken image and can be applied to communication with use of an image.

2. Description of the Related Art

A camera device including a face detector that detects the face of a subject from an image taken by an imaging element (imaging sensor) has been put into practical use.

As for communication with use of an image, applications in various forms, such as a television (TV, hereinafter) phone, a TV conference system, video mail, and video chat, have been put into practical use.

Each of these applications is so configured that the face of a subject and the background thereof are taken and the taken image is transmitted to a communication partner.

In Japanese Patent No. 3838506 (Patent Document 1, hereinafter), a communication system for exchange of video data among multiple points via a public network, and so on have been proposed. This communication system has a finite number of communication devices that exist at the multiple points and a communication control device that relays the exchange of video data among the finite number of communication devices. In this system, video data are exchanged among the finite number of communication devices in a closed manner.

SUMMARY OF THE INVENTION

Incidentally, in TV phone, TV conference, video chat, and so on, if an imaging subject is a user, image data obtained by capturing the face of the user is transmitted to a communication partner without any processing for the image data so as to be displayed on a display of the communication partner.

This imposes mental stress on the user who does not want the face thereof to be viewed by a communication partner because the privacy thereof can not be protected.

In addition, also in the case in which such a device is used in a house or an office but the user thereof does not want to transmit an image of the appearance in the house or the office, a problem arises that the appearance in the house or the office as well as the figure of the user becomes known by a communication partner and this is wrong in terms of privacy protection and protection of secrets in the office.

In the communication device disclosed in Patent Document 1 (FIG. 1 and so on), if the image input unit is a camera, a face is detected from a taken image by the area extractor. However, the image as the detection target needs to be captured first and delay due to this capturing arises.

Furthermore, typically processing of the function to detect a face from an image takes a long time and therefore a delay time due to the processing also arises.

Moreover, an image is processed for metadata based on the result of the face detection and the metadata is transmitted together with the image to a communication path by the communication unit through transmission data processing. Thus, a delay time arises because of the processing into the metadata.

For the above-described reasons, in the technique disclosed in Patent Document 1, the delay time due to the processing in the communication device is significantly long, and the load on the communication device is significantly heavy.

In addition, if the above-described processing is applied to a moving image (e.g. 30 fps) and an image based on a large number of pixels, the delay time and the load accompanying the processing in the communication device become more significant.

If a high-performance communication device is used in order to reduce the load, the system cost is increased although the delay time and the load can be reduced.

Furthermore, a memory for capturing an image for the delay time needs to be prepared for the above-described processing, and the system cost is increased because generally an image memory has high capacity.

Moreover, in view of the above-described circumstances, there is a possibility that visual recognition of an image becomes impossible and thus the system becomes impractical in the worst case due to the lowering of the frame rate of a moving image and the deterioration of the real-time property.

Furthermore, an image that is unprocessed after being captured by a camera (image that is not subjected to so-called privacy-mask processing) is stored in any recording unit at least temporarily in the communication device or the communication path. This image is possibly stolen by a malicious user or leaked due to hacking action from a network. In view of this point, privacy protection in a true sense is not achieved.

As a communication method that allows plural users at multiple points to communicate with each other with use of images, a TV conference system with use of a central control device is known.

However, in the case of applying a technique for privacy protection to such a TV conference system for multiple points, if the background is removed or a face area is processed for privacy protection, video resulting from the removal of the background or the processing of the face area is transmitted to all of the participants of the conference alike.

Furthermore, the system that allows plural users at multiple points to communicate with each other with use of images encompasses a form in which unspecified users participate, such as video chat on the web. In this case, video resulting from removal of a background or processing of a face area is required to be controlled depending on the communication partner. For example, there will be a case in which a user does not mind showing the face thereof to the users of specific image communication terminals but does not want to show the face thereof to the other users.

Similarly, also in a system for a TV conference among multiple points in business use, if the participants of the conference include both users in a company and users outside the company, it will be possible that showing an image including the background to the users in the company is permitted but communication to the users outside the company is carried out with the background removed.

In the communication system disclosed in Patent Document 1 (FIG. 16 and so on), if the communication control device executes privacy-mask processing based on metadata, all of image data that is converted into packets and corresponds to one entire image needs to be received first and communication delay due to this reception arises.

The acquired image data has been compressed (mpeg, jpeg, or the like) in general and the privacy-mask processing can not be executed unless the compressed data is restored to the original image. Furthermore, similar image compression processing needs to be executed after the privacy-mask processing and delay due to this processing arises.

In addition, the image data subjected to the privacy-mask processing and the compression processing needs to be converted into packets similarly and all of the image data corresponding to one entire image needs to be transmitted. Thus, corresponding communication delay arises.

For the above-described reasons, the delay time due to the processing in the communication control device is significantly long, and the load on the communication control device is significantly heavy.

In addition, if the above-described processing is applied to a moving image (e.g. 30 fps), an image based on a large number of pixels, and communication from plural users, the delay time and the load accompanying the processing in the communication control device become more significant.

If a high-performance communication control device is used in order to reduce the load, the system cost is increased although the delay time and the load can be reduced.

Furthermore, generally there are a wide variety of image data compression systems and the compression system that can be covered depends on the user and the web site. Therefore, supporting the communication control device encompassing these systems leads to increase in the cost also in terms of the management aspect such as maintenance.

In addition, the communication control device often needs to process and transmit many kinds of image data that are equal to the original image in the number of pixels (almost equal in the file size), such as an image that is not subjected to privacy-mask processing, an image in which a face area is subject to privacy-mask processing, and an image in which the background is subject to privacy-mask processing.

In this case, it is apparent that the communication traffic amount is significantly large. In view of the above-described circumstances, there is a possibility that visual recognition of an image becomes impossible and thus the system becomes impractical in the worst case due to the lowering of the frame rate of a moving image and the deterioration of the real-time property.

In the communication system disclosed in Patent Document 1 (FIG. 18 and so on), if the communication device A is connected to the communication network via the communication control device, the "communication control device" is equivalent to a so-called communication server and generally expensive.

It is extremely difficult that all users purchase such expensive apparatus.

In addition, generally an advanced technique is needed to install a communication server and it is difficult for a general user to install and operate it.

It would be possible to install the communication control device per a certain number of users. However, a communication server is generally expensive as described above. Thus, installing many servers leads to increase in the cost and operating them leads to further increase in the cost in terms of the management aspect such as maintenance.

There is a need for the present invention to provide an image processing device, a camera device, a communication system, an image processing method, and a program that allow shortening of the delay time due to processing and control to thereby enhance the real-time property and allow privacy protection in a true sense even if an image is leaked, without increase in the cost.

According to a first embodiment of the present invention, there is provided an image processing device including a face detector configured to detect a face based on a taken image, and an output processor configured to have a function to execute privacy-mask processing for privacy protection for an image of a face detected by the face detector or an image of the background of the face. The output processor includes a function to separately output an image of a face detected by the face detector and an image of the background of the face that are each subjected to or not subjected to the privacy-mask processing.

According to a second embodiment of the present invention, there is provided a camera device including an imaging element, an optical system configured to form a subject image on the imaging element, and an image processing device configured to execute image processing for an image taken by the imaging element. The image processing device includes a face detector that detects a face based on a taken image, and an output processor that has a function to execute privacy-mask processing for privacy protection for an image of a face detected by the face detector or an image of the background of the face. The output processor includes a function to separately output an image of a face detected by the face detector and an image of the background of the face which are each subjected to or not subjected to the privacy-mask processing.

According to a third embodiment of the present invention, there is provided a communication system including a transmission system configured to include a camera device and a transmitting device that transmits image data taken by the camera device, and a reception system configured to include a receiving device that receives image data transmitted from the transmission system via a communication path. In the above transmission system, the camera device includes an imaging element, an optical system that forms a subject image on the imaging element, and an image processing device that executes image processing for an image taken by the imaging element. The image processing device includes a face detector that detects a face based on a taken image, and an output processor that has a function to execute privacy-mask processing for privacy protection for an image of a face detected by the face detector or an image of the background of the face. The output processor is capable of separating a taken image into an image obtained by cutting out an area of a detected face and an image of the background of the area which are each subjected to or not subjected to the privacy-mask processing, and separately outputting the images resulting from the separation. The output processor is capable of outputting an image obtained by cutting out an area subjected to privacy-mask processing and an image of the background of the area as images different from each other. The output processor is capable of outputting information on an area from which a face is detected in an image, information on an area subjected to privacy-mask processing, or information on an area that is not subjected to privacy-mask processing in synchronization with an image corresponding to the information. The transmitting device transmits at least a background image that is taken at the same timing as the timing of a face and is obtained through separation. The receiving device in the reception system receives at least the transmitted background image.

According to a fourth embodiment of the present invention, there is provided an image processing method of executing processing of outputting at least an image of a face detected by a face detector and an image of the background of the face. The method includes the steps of detecting a face by the face detector based on a taken image, executing privacy-mask processing for privacy protection for an image of the detected face or an image of the background of the face, and separately outputting the image of the detected face and the image of the background of the face which are each subjected to or not subjected to the privacy-mask processing.

According to a fifth embodiment of the present invention, there is provided a program for causing a computer to execute image processing of executing processing of outputting at least an image of a face detected by a face detection function and an image of the background of the face. The image processing includes processing of detecting a face based on a taken image, processing of executing privacy-mask processing for privacy protection for an image of the detected face or an image of the background of the face, and processing of separately outputting the image of the detected face and the image of the background of the face which are each subjected to or not subjected to the privacy-mask processing.

According to the embodiments of the present invention, a face is detected by the face detector based on a captured image, and privacy-mask processing such as mosaic, blurring, or filling-in is executed for an image of the detected face and an image of the background thereof.

Subsequently, the image of the detected face and the image of the background thereof are separately output, and the area information of the detected face with respect to the background is output.

The embodiments of the present invention allow shortening of the delay time due to processing and control to thereby enhance the real-time property without increase in the cost.

In addition, the embodiments of the present invention allow privacy protection in a true sense even if an image is leaked.

BRIEF DESCRIPTION OF THE DRAWINGS

FIGS. 2A to 2M are diagrams showing examples of an original image and images subjected to privacy-mask processing;

DETAILED DESCRIPTION OF THE PREFERRED EMBODIMENT

An embodiment of the present invention will be described below in association with the drawings.

Figure 1:
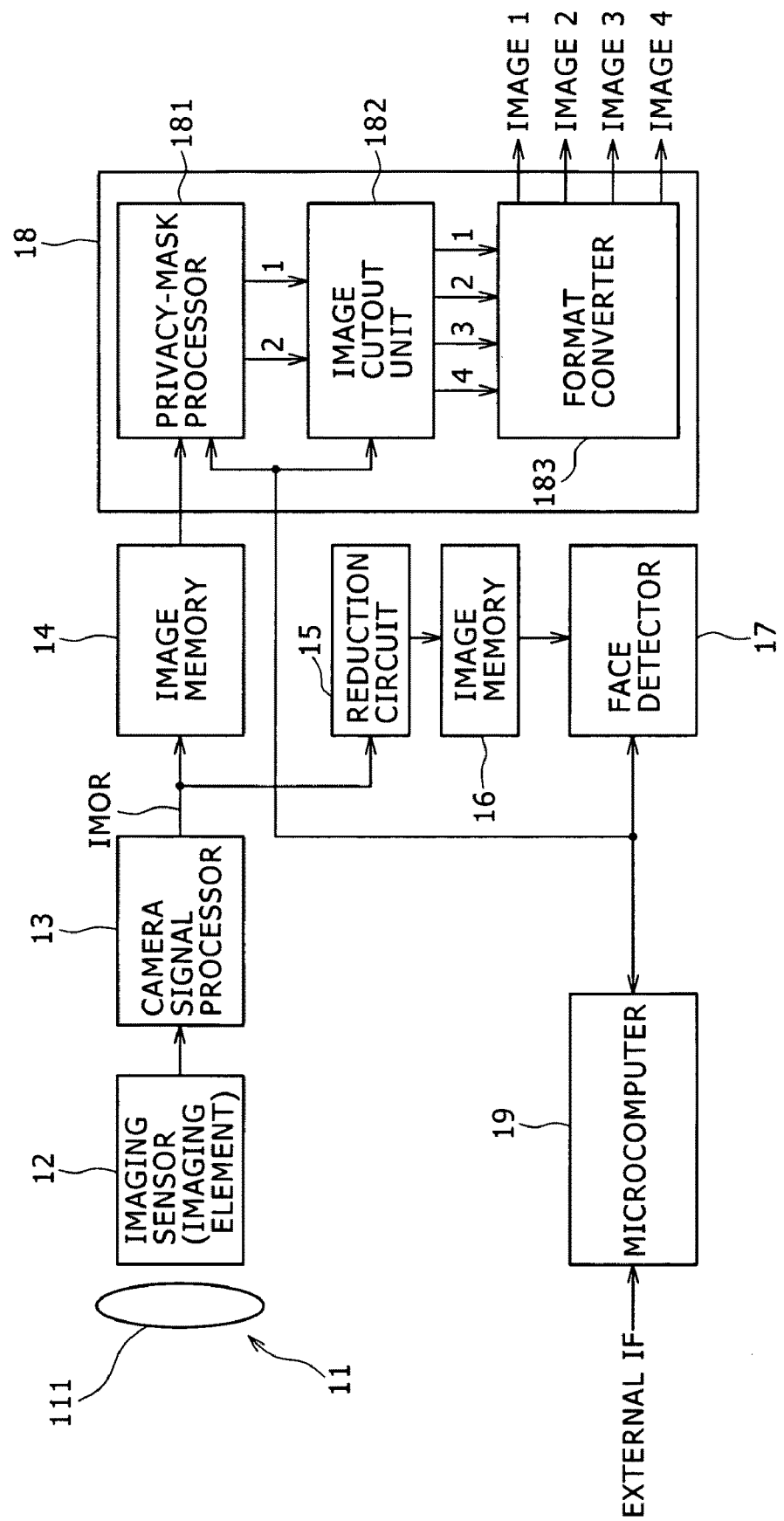
FIG. 1 is a block diagram showing a configuration example of a camera device employing an image processing device according to an embodiment of the present invention.

FIG. 1 is a block diagram showing a configuration example of a camera device employing an image processing device according to the embodiment of the present invention.

As shown in FIG. 1, a camera device 10 according to the present embodiment has an optical system 11, an imaging element (imaging sensor) 12, a camera signal processor 13, an image memory 14, a reduction circuit 15, a face-detection image memory 16, a face detector 17, an output processor 18, and a microcomputer 19 as a controller.

The camera device 10 according to the present embodiment is configured as a device that has functions to, under control by the microcomputer 19, detect a face by the face detector 17 based on a taken image and execute privacy-mask processing such as mosaic, blurring, or filling-in by the output processor 18 for an image of the detected face or an image of the background thereof. In addition, the camera device 10 is configured as a device that can separately output the image of the detected face and the image of the background thereof and can output the area information of the detected face with respect to the background.

The camera device 10 is so configured as to be capable of separating the taken image into the image obtained by cutting out the area of the detected face and the image of the background thereof (in the present embodiment, the image-removed area can be filled in with any single color) and separately outputting these images.

Naturally, it is also possible that the original taken image is not separated and thus two images are not separately output. The "separately outputting" may be outputting via different channels or outputting in a time-division manner.

The camera device 10 is so configured as to be capable of outputting the image obtained by cutting out the area subjected to privacy-mask processing such as mosaic, blurring, or filling-in and the image of the background thereof (in the present embodiment, the image-removed area can be filled in with any single color) as images different from each other.

Naturally, also in this case, it is also possible that the original taken image is not separated and thus two images are not separately output. The "images different from each other" may be output via different channels or output in a time-division manner.

The camera device 10 is so configured as to be capable of outputting information on the area from which a face is detected in an image, information on the area subjected to privacy-mask processing, information on the area that is not subjected to privacy-mask processing (in the case in which the privacy-mask processing is executed for the background), or information on the filled-in area in the background image, in synchronization with the image corresponding to the information.

This "outputting" may be readout from a control register in the camera device from the external or outputting via a channel different from that of the image outputting. In addition, in the case of digital image data, the area information may be buried as metadata in the image.

Also in this case, it does not matter whether or not the image is separated similarly to the above description.

The specific configuration and functions of the camera device 10 according to the present embodiment will be described below.

The optical system 11 includes e.g. a lens 111 and forms a subject image through the lens 111 on the imaging plane of the imaging element 12.

The imaging element 12 is formed of an imaging sensor that is e.g. a charge coupled device (CCD) or a complementary metal oxide semiconductor (CMOS) device.

The imaging element 12 detects the subject image formed by the optical system 11 and generates signal charges by optical sensors arranged in a matrix on a semiconductor substrate. The imaging element 12 reads out the signal charges via vertical signal lines and horizontal signal lines and outputs a digital image signal of the subject to the camera signal processor 13.

The camera signal processor 13 outputs the image subjected to processing such as color interpolation, white balance, YCbCr conversion processing, compression, and filing (hereinafter, referred to as the original image) as an image IMOR to the image memory 14 and the reduction circuit 15.

The original image is stored in the image memory 14.

The original image stored in the image memory 14 is subjected to privacy-mask processing, image cutout (separation), format conversion, and so on in the output processor 18 so as to be output to the external.

The image memory 14 for storing the original image is provided for executing plural times of the privacy-mask processing, the image cutout (separation), the format conversion, and so on in a time-division manner, and is not necessarily required.

In the present description, the image memory 14 is shown only as an example.

The reduction circuit 15 stores, in the face-detection image memory 16, an image obtained by reducing the original image IMOR (the entire area thereof or an area arising from separation and cutout) at any reduction rate and an image obtained by merely cutting out a part of the original image IMOR after separation thereof.

The reduction circuit 15 divides the entire image area of the original image IMOR (into e.g. 4/9/16/25/36 segments) e.g. by using information on setting of the image division and the areas to be cut out and information on the reduction rate, set by the microcomputer 19. The reduction circuit 15 supplies the images resulting from the division to the face detector 17.

The image size after the reduction is such a size as to allow the face detector 17 to execute processing.

The face detector 17 detects a face based on the images stored in the image memory 16 by using information on the size of the face to be detected, the area to be detected, and so on, set by the microcomputer 19.

The detection results by the face detector 17, such as the detection position and the face size, are supplied to the microcomputer.

The face detector 17 may be implemented by either software or hardware, and the algorithm, circuit configuration, and so on thereof may be publicly-known and existing ones.

The output processor 18 executes gamma processing, mask processing, format conversion, and so on for the image data obtained by executing distortion correction, cutout, synthesis, and so on for the original image output from the image memory 14. The output processor 18 outputs the resulting image data to the external.

The output processor 18 of FIG. 1 has a privacy-mask processor 181, an image cutout unit 182, and a format converter 183.

The privacy-mask processor 181 executes privacy-mask processing such as mosaic, blurring, or filling-in for the image of a face detected from the original image stored in the image memory 14 or the image of the background thereof, under control by the microcomputer 19 based on the face detection results.

The image cutout unit 182 cuts out e.g. an image of the area of the detected face, an image of the background thereof, an image of the area subjected to privacy-mask processing such as mosaic, blurring, or filling-in, and an image of the background thereof, and outputs the cut-out images to the format converter 183, under control by the microcomputer 19.

The format converter 183 executes format conversion processing for the cut-out images obtained by the image cutout unit 182, and outputs the resulting images together with area information in synchronization.

As the area information, any of the following kinds of information is output: information on the area from which a face is detected in an image; information on the area subjected to privacy-mask processing; information on the area that is not subjected to privacy-mask processing (in the case in which the privacy-mask processing is executed for the background); and information on the filled-in area in the background image.

The privacy-mask processor 181 may be implemented by either software or hardware, and the algorithm, circuit configuration, and so on thereof may be publicly-known and existing ones.

In the present example, the number of output channels of the privacy-mask processor 181 is two, and the numbers of output channels of the cutout unit 182 and the format converter 183 are each four. However, the numbers of output channels may be any. In addition, a configuration and control that allow outputting of images in a time-division manner are also possible.

The microcomputer 19 has functions to set the image division in the reduction circuit 15, the areas to be cut out, and the reduction rate, and control the image division, the cutout processing, and the reduction processing.

The microcomputer 19 has functions to set the size of the face to be detected by the face detector 17, the area to be detected by the face detector 17, and so on, and control the face detection processing. The microcomputer 19 acquires the detection results such as the position and the face size.

The microcomputer 19 carries out control over the face detector 17 and acquires the face detection result, i.e. the area from which a face is detected in the original image. Based on the result, the microcomputer 19 carries out control over the privacy-mask processor 181, and, depending on the case, carries out control for allowing the image cutout unit 182 to cut out or remove (separate) the image to thereby output the image via a different channel.

In the present embodiment, the area from which a face is detected in the original image, the area subjected to privacy-mask processing, or the image-removed area is output from an external interface (IF) to the microcomputer 19.

However, the present invention is not limited to this configuration, but it is also possible to provide an output separately and output the area in synchronization with image data therefrom. Alternatively, the information on the area may be buried as metadata in image data by the format converter.

A more specific description will be made below about privacy-mask processing for a taken image, image cutout/removal processing, area information, usage forms, and so on according to the present embodiment.

Initially the privacy-mask processing will be described below in association with FIG. 2.

<Privacy-Mask Processing>

FIGS. 2A to 2M are diagrams showing examples of an original image and images subjected to the privacy-mask processing.

Specifically, FIG. 2A shows the original image, from which one face is detected, and the other diagrams show examples in which the privacy-mask processing is executed for the area of the detected face and/or the area of the background thereof.

More specifically, FIG. 2B shows an example in which mosaic processing is executed for the face. FIG. 2C shows an example in which mosaic processing is executed for the background of the face. FIG. 2D shows an example in which mosaic processing is executed for all of the face and the background. FIG. 2E shows an example in which blur processing is executed for the face. FIG. 2F shows an example in which blur processing is executed for the background of the face. FIG. 2G shows an example in which blur processing is executed for all of the face and the background. FIG. 2H shows an example in which processing of filling-in with a single color is executed for the face. FIG. 2I shows an example in which processing of filling-in with a single color is executed for the background of the face. FIG. 2J shows an example in which processing of filling-in with a single color is executed for all of the face and the background. FIG. 2K shows an example in which blend processing is executed for the face. FIG. 2L shows an example in which blend processing is executed for the background of the face. FIG. 2M shows an example in which blend processing is executed for all of the face and the background.

The privacy-mask processor 181 in the present embodiment executes image processing (such as mosaic, blurring, filling-in, and blend (transmission) processing) for privacy protection for the area from which a face is detected in the original image IMOR and/or the area of the background thereof as shown in FIGS. 2A to 2M.

In the examples of FIGS. 2A to 2M, one face is detected from the original image and the privacy-mask processing is executed for the area of the face. However, the number of areas for which the privacy-mask processing is executed may be any (the privacy-mask processing may be executed for plural areas if plural faces are detected). The privacy-mask processing does not have to be executed for the areas. The privacy-mask processing may be executed for the whole of the original image IMOR.

In FIGS. 2A to 2M, a rectangle having a size almost equal to that of the detect face is employed as the area for which the privacy-mask processing is executed. However, the shape of the area may be a circle, an ellipse, or another shape, and the size thereof may also be any.

In addition, the mosaic width, the blurring degree, the color of the filling-in, and the color and transmittance of the blending may be any, and any of these schemes may be combined.

The image cutout/removal processing will be described below in association with FIGS. 3 to 5.
<Image Cutout/Removal Processing>

Figure 3:
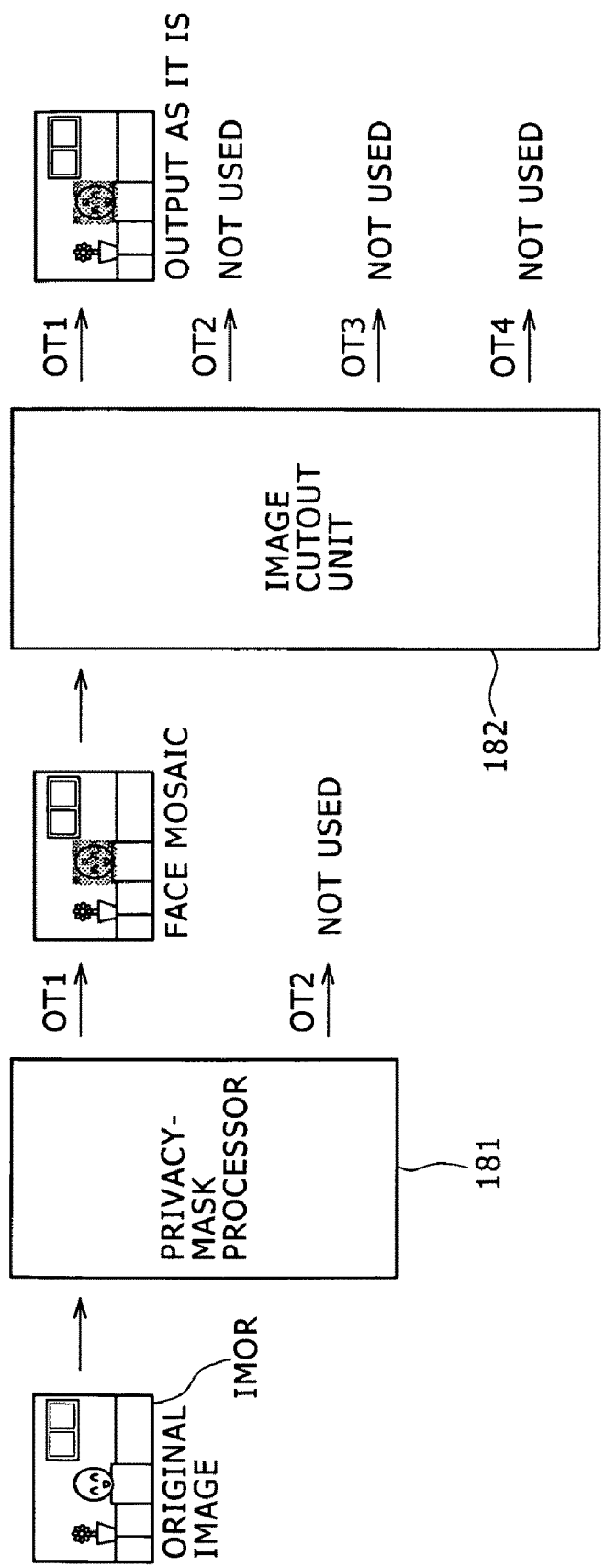
FIG. 3 is a diagram schematically showing a first operation example of an image cutout unit of the embodiment.

FIG. 3 is a diagram schematically showing a first operation example of the image cutout unit in the present embodiment.

Figure 4:
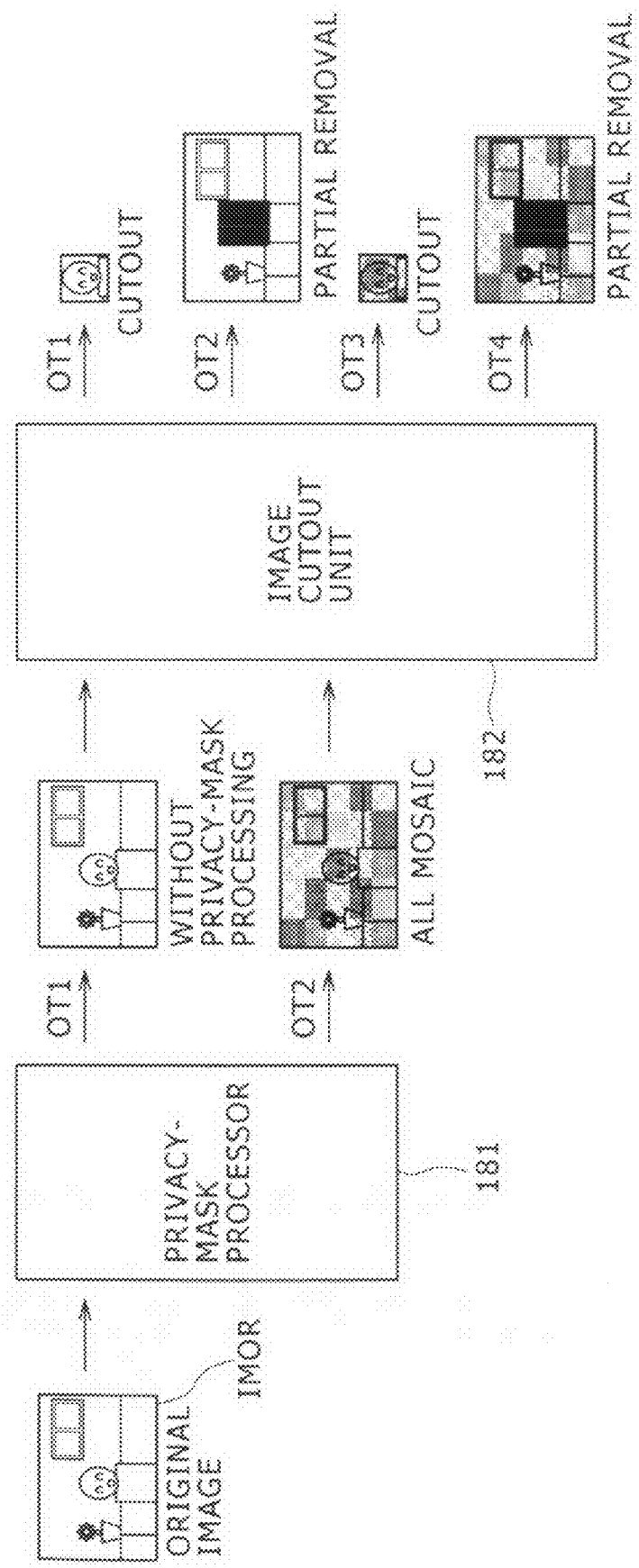
FIG. 4 is a diagram schematically showing a second operation example of the image cutout unit of the embodiment.

FIG. 4 is a diagram schematically showing a second operation example of the image cutout unit in the present embodiment.

Figure 5:
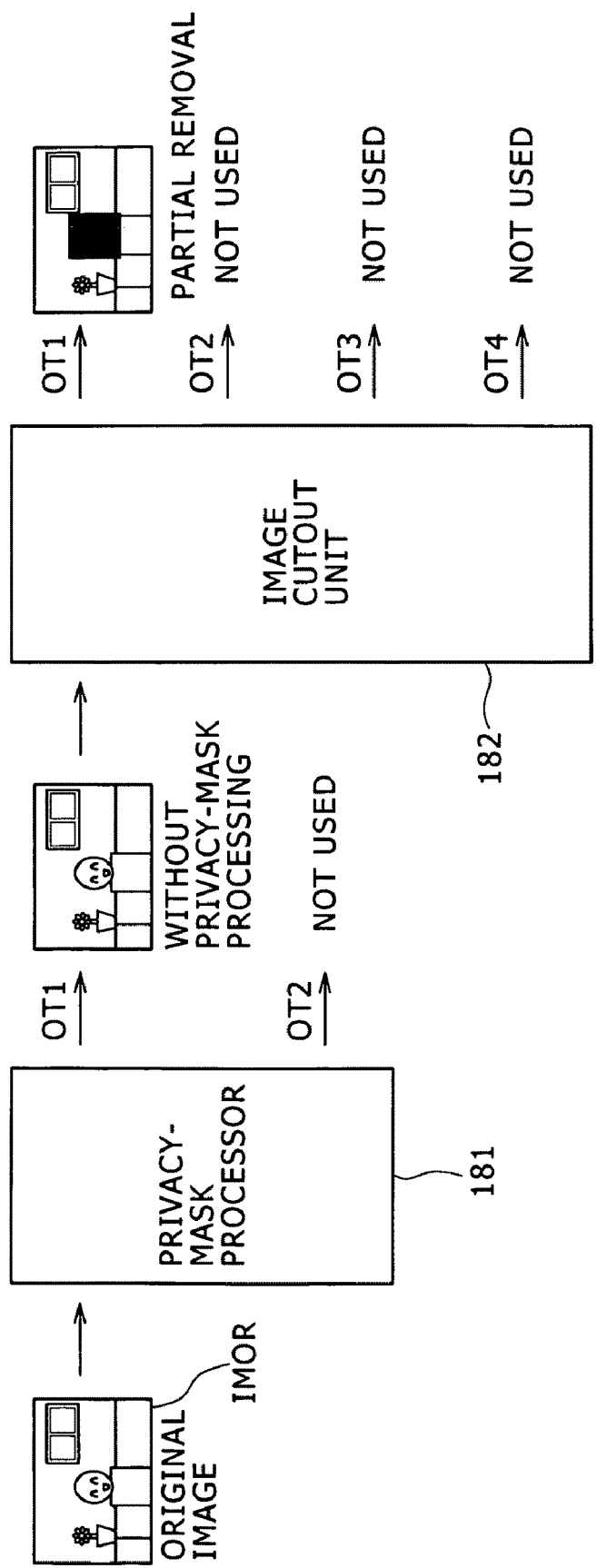
FIG. 5 is a diagram schematically showing a third operation example of the image cutout unit of the embodiment.

FIG. 5 is a diagram schematically showing a third operation example of the image cutout unit in the present embodiment.

The image cutout unit cuts out or removes (separates) any area from an image input from the privacy-mask processor.

The area to be cut out or removed does not have to be the area from which a face is detected in the original image or the area subjected to privacy-mask processing, and the size thereof may be any. The number of areas to be cut out may be any (plural areas may be cut out), and the areas do not have to be cut out or removed.

It is desirable that the shape of the area be a rectangle for reasons relating to image processing. However, any shape may be employed as long as the processing is possible.

FIG. 3 shows an example in which the privacy-mask processor 181 executes mosaic processing for the area from which a face is detected in the original image IMOR and then the resulting image is output as it is without any processing in the image cutout unit 182.

In the example of FIG. 4, the original image IMOR subjected to no processing is output as it is from an output OT1 of the privacy-mask processor 181, and the image obtained by executing mosaic processing for the entire area of the original image IMOR is output from an output OT2. Thereafter, the image cutout unit 182 cuts out and removes the images corresponding to the area from which a face is detected in the original image IMOR and then outputs the resulting images.

The image-removed area is filled in with any color.

In the example of FIG. 5, the privacy-mask processor 181 executes no processing, and the image cutout unit 182 removes the area from which a face is detected in the original image and then outputs the resulting image.

The image-removed area is filled in with any color.
<Area Information>

The area information refers to information for indicating the area from which a face is detected in the original image, the area subjected to privacy-mask processing, or the image-removed area. This information indicates the horizontal start position, horizontal width, vertical start position, and vertical width of the area in the original image, or the horizontal start position, horizontal end position, vertical start position, and vertical end position of the area in the original image.

The area information to be output is any depending on the usage form described below.

The usage forms of the camera device 10 having the above-described configuration will be described below.
<Usage Forms of Camera Device>

Mainly the following three usage forms of the camera device 10 according to the present embodiment can be cited if privacy protection in TV phone, TV conference, video chat, and so on is aimed by use of the camera device 10.
<First Usage Form>

In a first usage form, the privacy of a transmitter is protected against all of receiving devices.

In this form, like the example of FIG. 3, an image subjected to privacy-mask processing is output from the camera device 10 itself so as to be transmitted toward the respective receiving devices, and the receiving devices simply receive and display the image.

At this time, area information may also be transmitted simultaneously.
<Second Usage Form>

Figure 6:
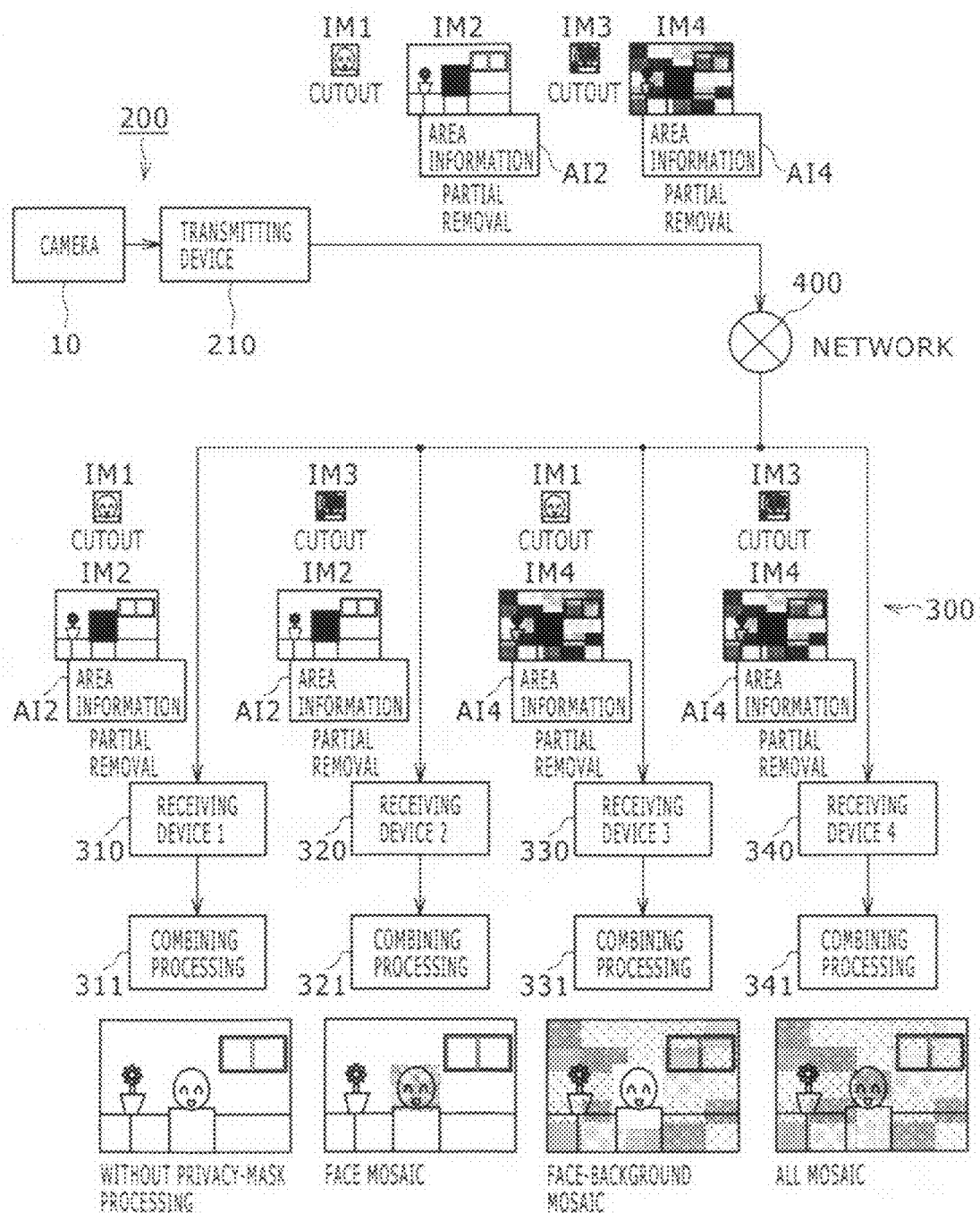
FIG. 6 is a diagram showing a configuration example of a communication system relating to a second usage form of the camera device according to the embodiment.

FIG. 6 is a diagram showing a configuration example of a communication system relating to a second usage form of the camera device according to the present embodiment.

This communication system 100 is so configured that a transmission system 200 and a reception system 300 can communicate with each other via a network 400.

The transmission system 200 includes the camera device 10 according to the present embodiment and a transmitting device 210 that transmits the output of the camera device 10 to the network 400.

The reception system 300 has receiving devices 310, 320, 330, and 340. The receiving devices 310, 320, 330, and 340 include combining processors 311, 321, 331, and 341, respectively, each having an image combining function.

The transmitting device 210 in the transmission system 200 transmits background images IM2 and IM4 obtained through imaging and separation at the same timing, area information AI2 of the image IM2 and area information AI4 of the image IM4, and cut-out images IM1 and IM3 toward the receiving devices 310, 320, 330, and 340 in the reception system 300.

In the example of FIG. 6, the cut-out image IM1 is an image of a face that is not subjected to privacy-mask processing, and the cut-out image IM3 is an image of a face subjected to mosaic processing as privacy-mask processing.

The background image IM2 is the image obtained by removing the cut-out image IM1 of the face from the original image, and the background image IM4 is the image obtained by removing the cut-out image IM3 of the face from the original image.

The receiving devices 310, 320, 330, and 340 receive the background images IM2 and IM4, the area information AR2 and AR4 thereof, and the cut-out images IM1 and IM3. Based on the area information, the receiving devices combine the cut-out image with the background image by the combining processors 311, 321, 331, and 341 to thereby create each one image.

In the example of FIG. 6, the receiving device 310 receives the cut-out image IM1 and the background image IM2. The combining processor 311 executes combining processing to thereby create (restore) an image that is not subjected to privacy-mask processing.

The receiving device 320 receives the cut-out image IM3 and the background image IM2. The combining processor 321 executes combining processing to thereby create (restore) an image in which mosaic processing is executed for the face.

The receiving device 330 receives the cut-out image IM1 and the background image IM4. The combining processor 331 executes combining processing to thereby create (restore) an image in which mosaic processing is executed for the background.

The receiving device 340 receives the cut-out image IM3 and the background image IM4. The combining processor 341 executes combining processing to thereby create (restore) an image in which mosaic processing is executed for all of the face and the background.

In this manner, the communication system 100 allows privacy protection in a true sense.

The background image and the area information thereof may be buried as metadata in image data.

In the present embodiment, the background image, the cut-out image, the image that is not subjected to privacy-mask processing, and the image subjected to privacy-mask processing are treated as communication data different from each other.

The "communication system" of the present example includes also the network 400 as shown in FIG. 6. The above-described communication data may be in conformity to an existing communication protocol. The image (compression) format of the above-described image data may be existing one.

As above, in the second usage form, the privacy of a transmitter is not protected for any receiving devices, whereas the privacy of the transmitter is protected against the other receiving devices.

Specifically, as shown in FIG. 4, a cut-out image that is not subjected to privacy-mask processing, a partially-removed image that is not subjected to privacy-mask processing, and the area information thereof are output from the camera device 10. In addition, a cut-out image subjected to privacy-mask processing, a partially-removed image subjected to privacy-mask processing, and the area information thereof are output from the camera.

Subsequently, as shown in FIG. 6, these images and the area information are transmitted to the receiving devices 310 to 340. The receiving devices 310 to 340 receive the partially-removed images, the area information thereof, and the cut-out images and combine the cut-out image with the background image based on the area information so as to display the images.

Due to this operation, in the reception system 300, various kinds of privacy protection intended by the transmitter can be achieved corresponding to each of any of the receiving devices by merely combining the simply-received cut-out image with the simply-received partially-removed image.

In FIG. 6, the number of kinds of image data to be transmitted is four as an example. However, the number of kinds of image data may be any depending on the use purpose.

For example, if communication is carried out with only the receiving devices 310 and 320, it is sufficient to transmit three kinds of image data: the image data IM1, IM2, and IM3 of FIG. 6.

Furthermore, the image data is not transmitted from the transmitting device to a respective one of the receiving devices sequentially, but generally the image data can be transmitted to plural receiving devices based on broadcast communication by use of a communication control device (communication server). Thus, naturally, it is sufficient for the transmitting device to transmit the necessary number of kinds of the image data only once irrespective of the number of receiving devices.

<Third Usage Form>

Figure 7:
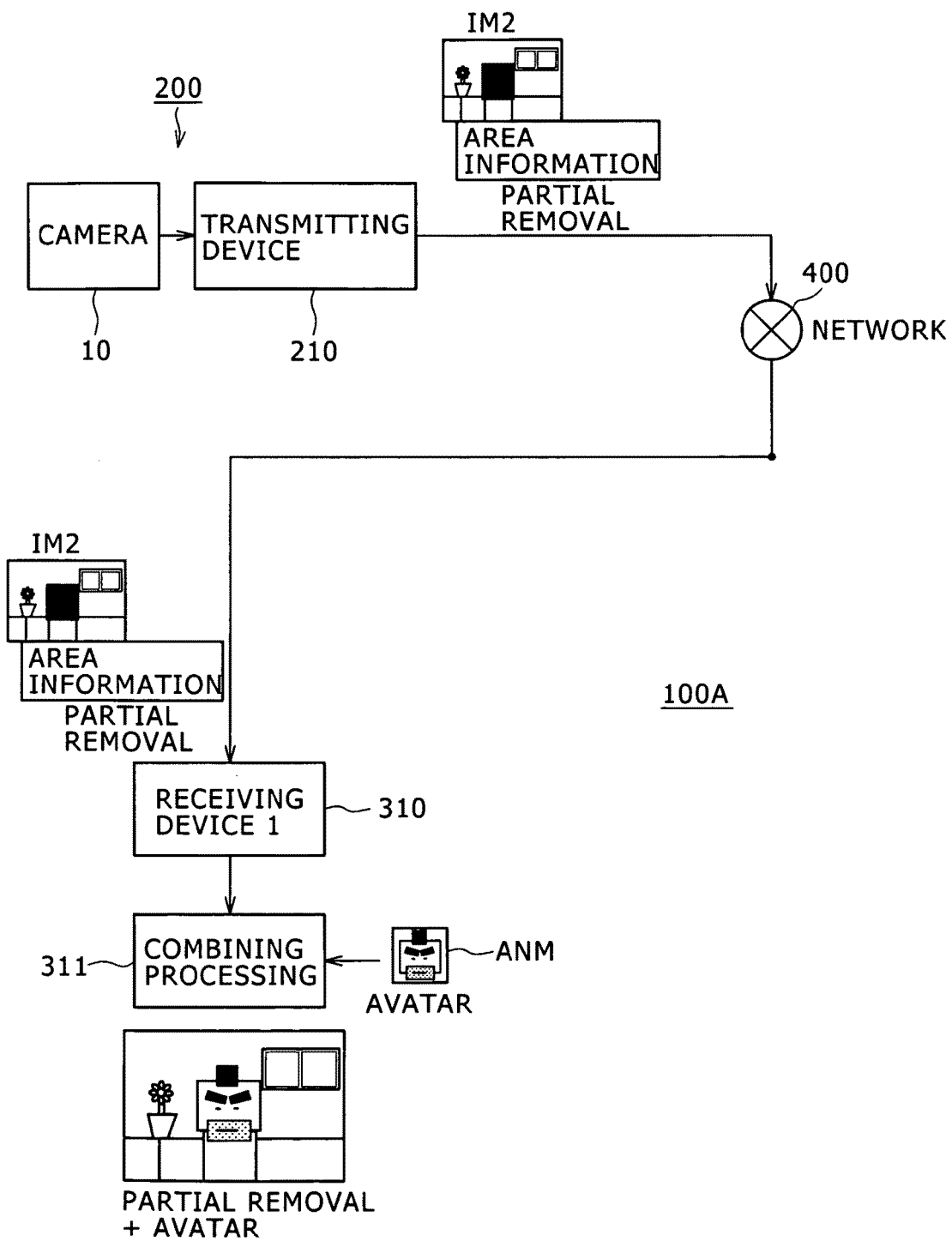
FIG. 7 is a diagram showing a configuration example of a communication system relating to a third usage form of the camera device according to the embodiment.

FIG. 7 is a diagram showing a configuration example of a communication system relating to a third usage form of the camera device according to the present embodiment.

In the third usage form, the transmitting device 210 transmits the taken background image (in this case, the image-removed area is filled in with any single color) IM2 to the receiving device 310 or the like. The receiving device 310 or the like receives the background image and detects the area corresponding to the image cut out from the background image. Based on the detection result, the receiving device 310 or the like combines an avatar (animation character) ANM with the background image by the combining processor 311 or the like to thereby create one image.

In this example, a cut-out image is not communicated.

Similarly to the above description, this communication system 100A includes also the network 400. The above-described communication data may be in conformity to an existing communication protocol. The image (compression) format of the above-described image data may be existing one.

Using the avatar ANM may be regarded as privacy protection or may be regarded as amusement.

In this manner, in the third usage form, a transmitter is represented by an avatar for all of the receiving devices to thereby protect the privacy of the transmitter.

Specifically, as shown in FIG. 5, an image from which the area of a detected face is removed and the area information of this image are output from the camera device 10. Subsequently, as shown in FIG. 7, the image and the area information are transmitted to each receiving device. The receiving device combines the image of the avatar ANM with the background image based on the received partially-removed image and area information thereof, and displays the created image.

The following scheme is also available. Specifically, only an image from which the area of a detected face is removed is output from the camera device 10 (without using area information), and only the image is transmitted to each receiving device. The receiving device detects the image-removed area in the received partially-removed image by chromakey (technique for detecting a specific color) or the like. Based on the detection result, the receiving device combines an avatar with the background image and displays the created image.

The algorithm, circuit configuration, and so on for the detection of the image-removed area by chromakey may be any.

<Application of Usage Form>

The above-described usage forms may be combined with each other.

For example, it will be possible that, in the first usage form, area information is transmitted and certain receiving devices display the received image as it is whereas other certain receiving devices display an image including an avatar based on the area information.

Also as described above, the number of images to be cut out and the number of image-removed areas are any.

In this case, the number of kinds of images to be transmitted and the number of images to be transmitted often become large and the number of images to be combined often becomes large, naturally.

Next, image combining methods will be described below.

<Image Combining Method>

Figure 8:
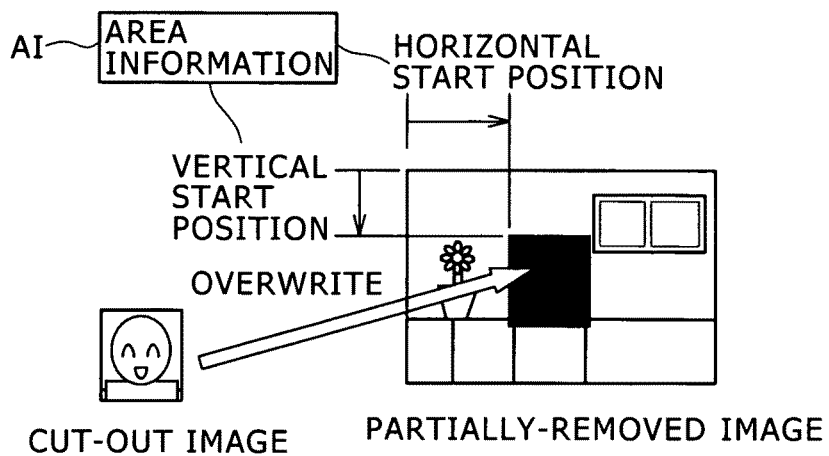
FIG. 8 is a first diagram for explaining an image combining method.

FIG. 8 is a first diagram for explaining an image combining method.

Figure 9:
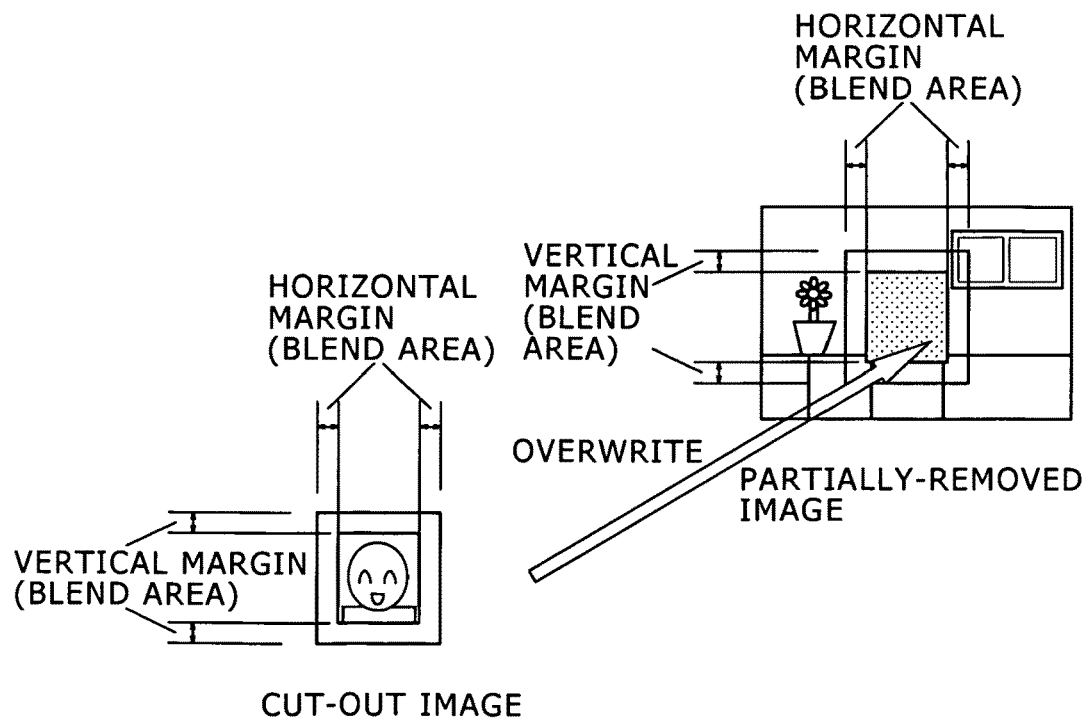
FIG. 9 is a second diagram for explaining an image combining method.

FIG. 9 is a second diagram for explaining an image combining method.

Figure 10:
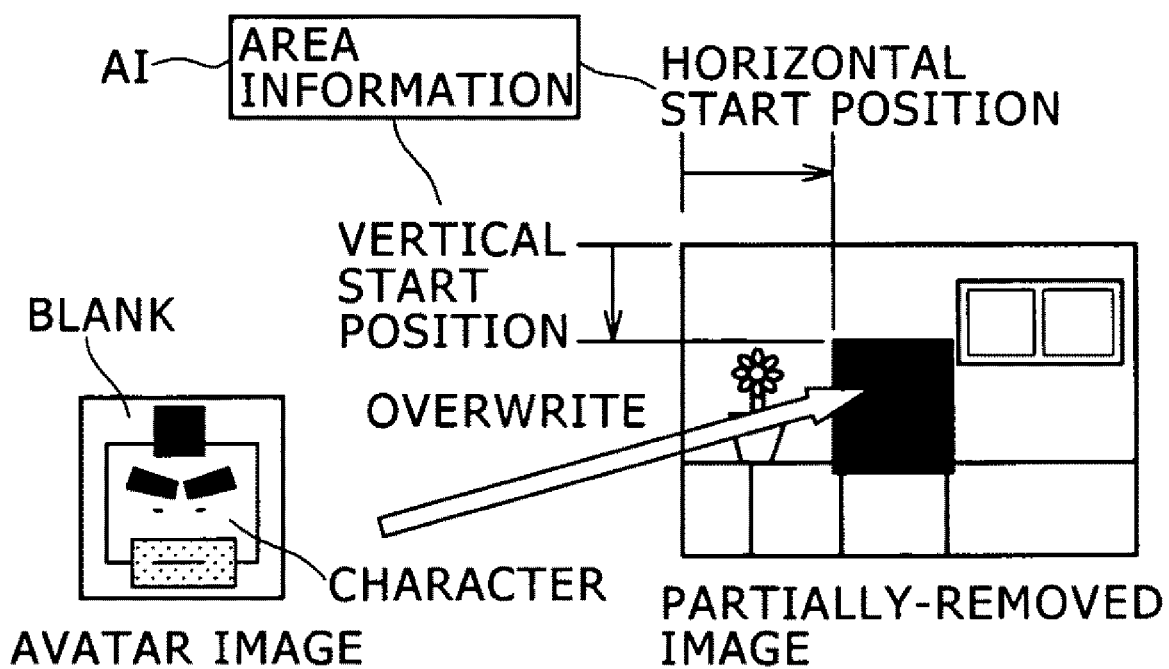
FIG. 10 is a third diagram for explaining an image combining method.

FIG. 10 is a third diagram for explaining an image combining method.

As a method for combining a cut-out image with a partially-removed image in the second and third usage forms, the cut-out image is overwritten on the partially-removed image based on the horizontal start position and the vertical start position acquired from area information, as shown in FIG. 8.

However, this method involves a possibility that the boundary between the cut-out image and the partially-removed image is distinct as a result of compression and restoring of these images through communication.

For this case, as shown in FIG. 9, a margin (blank) with any width is provided for the image to be cut out and the area of this width is subjected to blend (transmission) processing with a partially-removed image at the time of image combining.

The algorithm, circuit configuration, and so on for the blend (transmission) processing may be any.

In the case of FIG. 9, area information may be processed based on the premise that both the transmitting and receiving devices know the provision of the margin having any predetermined width. Alternatively, margin information may be separately transmitted from the transmitting device to the receiving device or may be buried as metadata in image data.

As a method for combining an avatar image with a partially-removed image in the third usage form, as shown in FIG. 10, an avatar image having such a size as to cover the image-removed area is overwritten based on the horizontal start position, the vertical start position, and so on acquired from area information in such a way that the area of the blank of the avatar image is not overwritten whereas the area of the character of the avatar image is overwritten.

It is also possible to define an α value (transmittance) for the avatar image and execute blend (transmission) processing. For example, α is set to 100% for the blank area and α is set to 0% for the character area.

<Apparatus of Image Combining>

In the above-described usage forms, the receiving device is employed as apparatus that combines images as an example. However, an image (avatar, in the case of the third usage form) may be combined in any apparatus (including the transmitting device, a personal computer (PC), a communication control device (communication server), a web server, and so on) on the communication path.

<Avatar Image>

Figure 11:
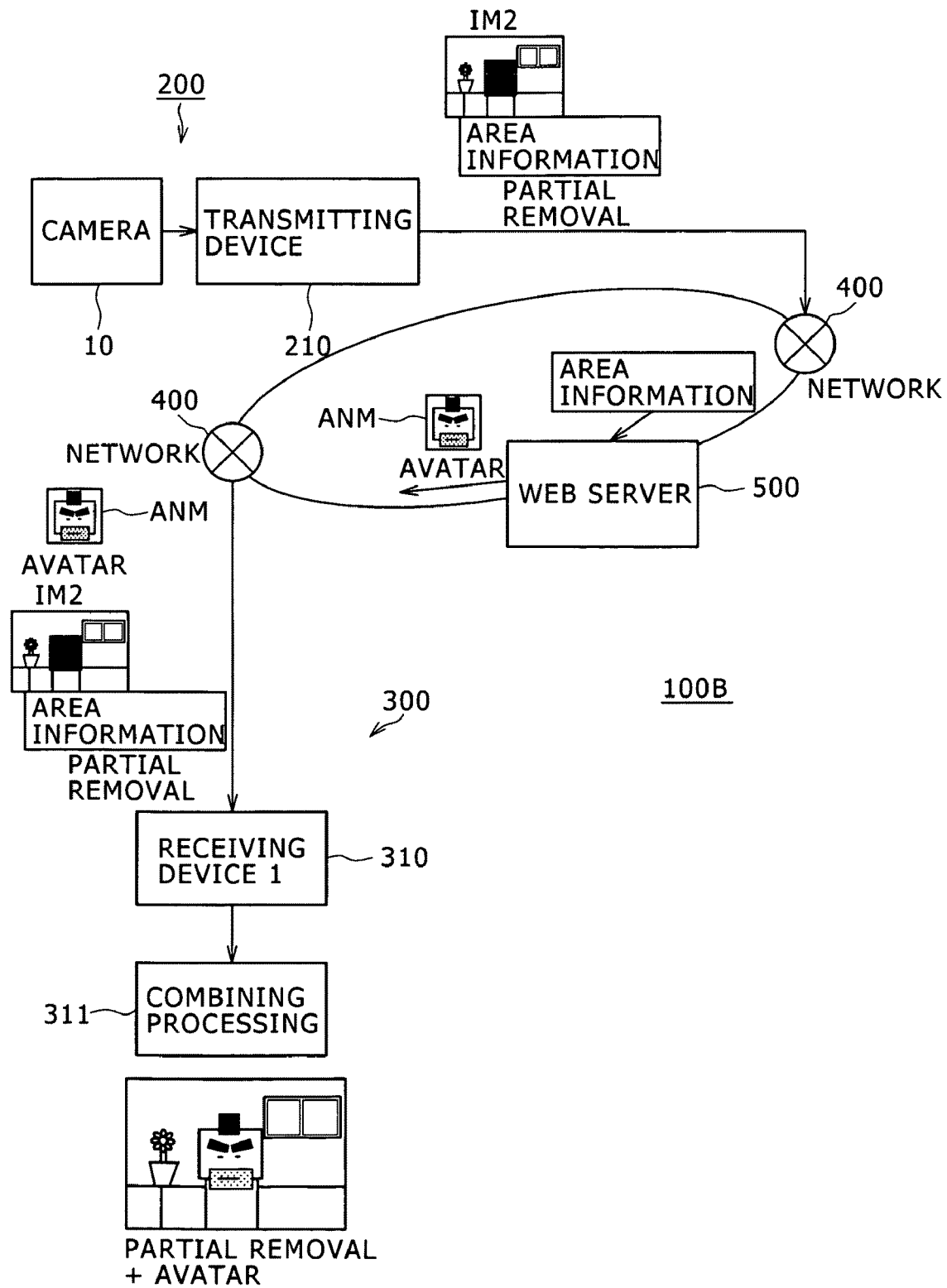
FIG. 11 is a diagram showing an example in which a web server transmits an avatar image to a receiving device based on area information.

FIG. 11 is a diagram showing an example in which a web server transmits an avatar image to a receiving device based on area information.

In the above-described third usage form, the receiving device prepares an avatar image and combines it, as an example. However, any apparatus (including the transmitting device, a personal computer (PC), a communication control device (communication server), a web server, and so on) on the communication path may transmit an avatar image to the receiving device based on area information AI, and the receiving device may combine the image.

Specifically, as shown in FIG. 11 for example, it is also possible that a web server 500 transmits an image of the avatar ANM to the receiving device based on the area information AI.

As described above, the present embodiment can achieve the following advantages.

The camera device itself outputs a privacy-protected image. Thus, even when a recording device exists in a communication system, privacy can be protected in a true sense even if the image is leaked due to stealing of the image data by a malicious user or hacking action from a network, because the image that is stored (at least temporarily) has been subjected to a privacy mask.

Because various kinds of images and the area information thereof are output from the camera device itself, the transmitting device does not need to have the face detection function. Therefore, the system cost can be greatly reduced and the load of the processing and control can be reduced. In addition, the delay time due to the processing and control can be greatly shortened, which enhances the real-time property.

In the case in which a cut-out image, a partially-removed image, and area information thereof output from the camera device itself are transmitted from the transmitting device and the receiving device combines these images to thereby display an image subjected to privacy-mask processing, a communication control device (communication server) does not need to have the function to execute the privacy-mask processing. In addition, depending on the case, plural kinds of images subjected to the privacy-mask processing do not need to be transmitted to each receiving device. Therefore, the system cost can be greatly reduced and the load of the processing and control can be reduced. In addition, the delay time due to the processing and control can be greatly shortened, which enhances the real-time property.

In the above-described configuration, it is sufficient for the communication control device (communication server) to only carry out routing or broadcast communication of packets merely. Therefore, the load and delay thereof are equivalent to those of the communication control device in the related art.

Furthermore, because images do not need to be restored, various compression systems do not need to be supported.

In the case in which various kinds of images and area information thereof are output from the camera device itself and are transmitted from the transmitting device, the respective receiving devices can easily permit protection of various kinds of privacy of the transmitter, corresponding to the receiver, merely through combining of received images.

In the case in which a cut-out image and a partially-removed image output from the camera device itself are transmitted from the transmitting device, the number of pixels in the cut-out image is small and thus the image data size thereof is small. In addition, compressing the partially-removed image results in a small image data size because generally the existence of a single-color plain area in an image provides high compression efficiency.

Therefore, the communication traffic is greatly reduced and thus the real-time property is enhanced compared with the case in which image data that is subjected to privacy-mask processing and has a size almost equal to that of the original image is transmitted from the communication control device (communication server) to the receiving device.

Furthermore, if a partially-removed image and area information thereof are output from the camera device itself and an image including an avatar is displayed, the communication traffic is greatly reduced and thus the real-time property is enhanced similarly to the above description.

Moreover, an application in which an avatar image is transmitted from a web server to a receiving device based on area information can also be easily achieved without sacrificing the real-time property.

In this case, there is no need to prepare the avatar image in the receiving device.

For the above-described reasons, privacy protection is possible and various kinds of privacy protection intended by a transmitter can be achieved corresponding to the respective receivers. In addition, it is possible to easily achieve a communication system that includes transmitting and receiving devices, a personal computer (PC), a communication control device (communication server), a web server, and so on and has light load, small communication traffic, and high real-time property. The cost of the communication system can be greatly reduced.

Basically the embodiment of the present invention can cover the overall cameras such as typical digital still cameras and monitoring cameras irrespective of the presence or absence of optical zoom, fixed focus, and so on. In addition, the embodiment of the present invention can be applied also to a camera that allows wide-angle imaging.

It is also possible that the method described in detail above is implemented as a program corresponding to the above-described procedure and executed by a computer such as a central processing unit.

Such a program can be stored in a recording medium such as a semiconductor memory, magnetic disc, optical disc, floppy (registered trademark) disc, or the like and can be executed through access by a computer in which this recording medium is set.

It is to be understood that while invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An image processing device comprising:
a face detector configured to detect a face based on a taken image; and
an output processor configured to have a function to execute privacy-mask processing for privacy protection for an image of a face detected by the face detector or an image of a background of the face, wherein
the output processor includes
a function to output a first image of a face detected by the face detector and a first image of a background of the face which are each subjected to the privacy-mask processing, output a second image of the face detected by the face detector and a second image of the background of the face which are each not subjected to the privacy-mask processing, combine the first image of the face with the second image of the background to generate a combined image or combine the second image of the face with the first image of the background to generate a combined image, such that when the combined image of the face is subjected to privacy processing the privacy processing performed on the face of the combined image can be undone without use of the background of the combined image.

2. The image processing device according to claim 1, wherein
the output processor is capable of separating a taken image into an image obtained by cutting out an area of a detected face and an image of a background of the area and separately outputting the images resulting from the separation.

3. The image processing device according to claim 1, wherein
the output processor is capable of outputting an image obtained by cutting out an area subjected to privacy-mask processing and an image of a background of the area as images different from each other.

4. The image processing device according to claim 1, wherein
the output processor is capable of outputting information on an area from which a face is detected in an image, information on an area subjected to privacy-mask processing, or information on an area that is not subjected to privacy-mask processing in synchronization with an image corresponding to the information.

5. The image processing device according to claim 2, wherein
the output processor is capable of filling in an image-removed area with any color, and
the output processor is capable of outputting information on an area from which a face is detected in an image, information on an area subjected to privacy-mask processing, information on an area that is not subjected to privacy-mask processing, or information on an filled-in area in a background image in synchronization with an image corresponding to the information.

6. An image processing method of using a processor for executing processing of outputting an image of a face detected by a face detector and an image of a background of the face, the method comprising the steps of:
detecting a face by the face detector based on a taken image;
executing privacy-mask processing for privacy protection for an image of the detected face or an image of a background of the face; and
performing a function to output a first image of a face detected by the face detector and a first image of a background of the face which are each subjected to the privacy-mask processing, output a second image of the face detected by the face detector and a second image of the background of the face which are each not subjected to the privacy-mask processing, combine the first image of the face with the second image of the background to generate a combined image or combine the second image of the face with the first image of the background to generate a combined image, such that when the combined image of the face is subjected to privacy processing the privacy processing performed on the face of the combined image can be undone without use of the background of the combined image.

7. A non-transitory computer-readable medium having stored thereon a computer-readable program for causing a computer to execute image processing of executing processing of outputting an image of a face detected by a face detection function and an image of a background of the face, the image processing comprising:

processing of detecting a face based on a taken image;

processing of executing privacy-mask processing for privacy protection for an image of the detected face or an image of a background of the face; and processing of performing a function to output a first image of a face detected by the face detector and a first image of a background of the face which are each subjected to the privacy-mask processing, output a second image of the face detected by the face detector and a second image of the background of the face which are each not subjected to the privacy-mask processing, combine the first image of the face with the second image of the background to generate a combined image or combine the second image of the face with the first image of the background to generate a combined image, such that when the combined image of the face is subjected to privacy processing the privacy processing performed on the face of the combined image can be undone without use of the background of the combined image.

* * * * *